Figure 1:
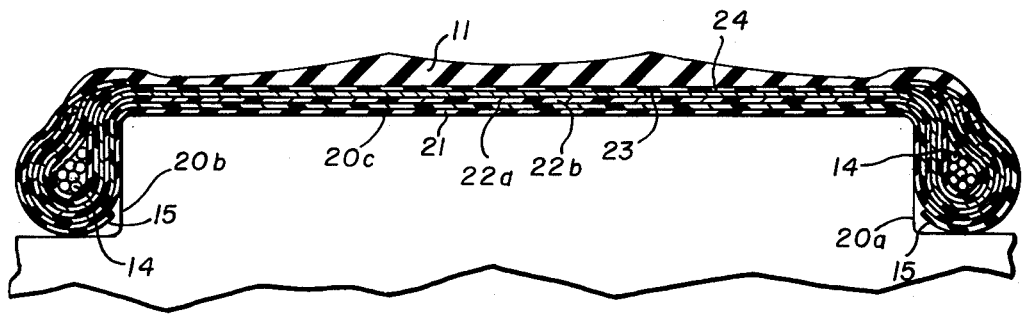

June 21, 1966     E. R. McFEE     3,256,922

PNEUMATIC TIRE

Filed Jan. 27, 1964

INVENTOR.
EUGENE R. McFEE

BY

ATTORNEY 3,256,922
PNEUMATIC TIRE
Eugene R. McFee, 1554 Salem Ave., Akron 6, Ohio
Filed Jan. 27, 1964, Ser. No. 340,250
7 Claims. (Cl. 152—354)

This invention relates to the art of pneumatic tires and in particular has reference to a pneumatic tires that is constructed with at least one ply thereof comprising pliable plastic film stock in lieu of plies of conventional fabric stock having longitudinally non-extensible cord members therein.

In the art of pneumatic tire manufacture, it has been long known that a series of building plies can be wrapped around a building drum in overlapped relationship so as to form a cylindrical carcass that is, in turn, covered by tread stock and, subsequently, deformed to the requisite toroidal shape.

In the manufacture of tires in accordance with the accepted procedure, it has long been the practice to arrange the cords of the individual ply at an angular inclination with respect to the longitudinal edges of the ply. This arrangement permits the plies to be alternately applied so that the cord members thereof criss-cross each other for the purpose of providing stability to the tire body.

It is believed apparent that making plies of conventional cord stock in accordance with this procedure involves the subsequent steps of cutting the calendered material at the proper bias angle so as to provide cords that extend diagonally of the longitudinal dimension of the ply stock. Further, it has been necessary to alternately apply the ply stock in such a fashion that the cord portions criss-cross to provide the requisite stability.

It has been discovered that such ply stock can be eliminated and replaced by a sheet of pliable plastic material that has resistance to stretch both longitudinally and transversely, with one sheet of such material serving to provide the support that would otherwise be provided by two super-imposed conventional plies whose cord members had been criss-crossed in accordance with the accepted procedure. Thus, and by bonding an improved sheet of such material to an inner liner followed by super-imposition of a tread member, it has been found that a tire can be produced that will have appropriate resistance to deflection but yet will be simplified in production due to the elimination of the necessary steps that would otherwise be required to produce and position the conventional ply members.

It has been further discovered that the overall strength and longevity of the improved tire of this invention can be further enhanced by interposing a layer of mesh Fiberglas material beneath the tread, with this mesh material, by virtue of its inextensibility both longitudinally and transversely, serving to augment the similar qualities that are possessed by the aforementioned plastic sheet member that replaces the conventional ply sheet.

Production of an improved tire having the above characteristics accordingly becomes the principal object of this invention, with other objects of this invention becoming more apparent upon a reading of the following brief specification, considered and interpreted in the light of the accompanying drawings.

Figure 2:
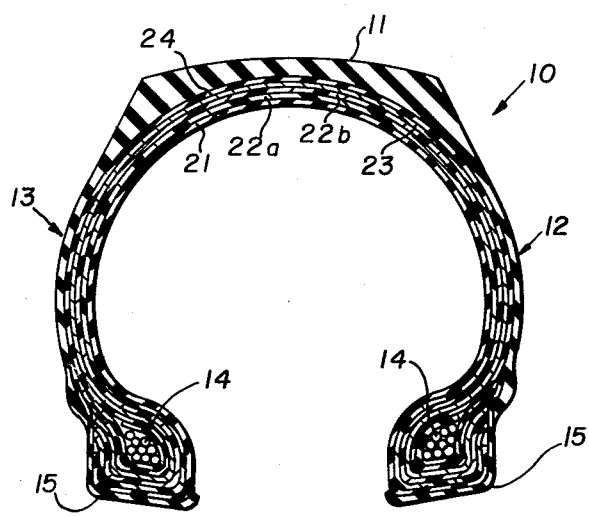
Figure 3:
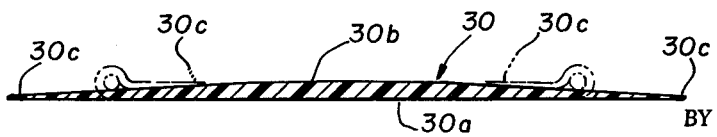

In the drawings:
FIGURE 1 is a cross-sectional view through the improved tire in its flat or unformed position on the building drum.
FIGURE 2 is a similar sectional view showing the tire following forming to toroidal configuration.
FIGURE 3 is a sectional view of a modified sheet of stock for use in the improved tire.

Referring now to the drawings and in particular to FIGURE 2 thereof, the improved tire 10, generally consists of a tread portion 11 having opposed sidewall portions 12 and 13 and opposed bead members 14, 14, with the just described components parts being formed to the toroidal position of FIGURE 2 for use in known manner.

Referring now to FIGURE 1 for a step by step analysis of the manner in which the improved tire is built, it will be first noted that a building drum 20 is provided with shoulders 20a and 20b beyond which the bead rings 14, 14 may be positioned, with the central region 20c of the building drum preferably being collapsible in any one of several known fashions so as to permit removal of the tire when the same has been built to the final toroidal form. It should be understood that any conventional method of positioning or "setting" the bead rings may be used.

With regard to the structure of the tire 10, the same is constructed by first applying an inner liner 21 of pure, reclaimed, or synthetic rubber over the exterior surface of the drum 20, with application of this liner being followed by application of a layer 22 that includes one or more layers of inextensible flexible material such as Orlon, Dacron, rayon or nylon that is possessed of high tear strength, both longitudinally and transversely. In the preferred form of the invention shown in FIGURE 1, an inner layer 22a and an outer layer 22b are shown included, with the layer 22a preferably having its greatest tear resistance in a longitudinal direction, while the layer 22b has its greatest tear resistance in the transverse dimension. In this regard, it is to be understood that the use of two such layers is not mandatory, and in many instances not requiring such severe useage one such layer could be provided with satisfactory results. Similarly the number of layers may be increased for improved strength and also the gauge of the layers may be varied for varying strength requirements.

Preferably superimposed on the just described layer 22 is a second layer 23 of pure, reclaimed, or synthetic rubber, with the layer 22 having its opposed faces bonded to the inner and outer rubber layers 21 and 23 by a conventional rubber cement or other suitable adhesive.

The form of the invention shown in the drawings further envisions a provision of additional support by the inclusion of a layer of Fiberglas mesh or screen-like material 24 on top of the just described layer 23, with this material again being suitably bonded to the layer 23 and further being suitably bonded to the tread stock 11 and the sidewall portions 12 and 13 that are also superimposed thereon, as clearly shown in FIGURES 1 and 2 of the drawings. In this regard the Fiberglas layer 24 will enhance the strength of the improved tire, however it should be understood that this layer can be replaced by a layer of conventional cord stock if desired.

Following positioning of the component layers, as just described, the conventional turn-over operation may be effectuated so as to turn the edges of the just described layers over the spaced beads 14, 14 and application of conventional chafer strips 15, 15 for the purpose of providing a completely "flat built" tire carcass which may then be removed from the building drum by collapsing the central portion 20c. The flat built tire thus created may be then cured in conventional fashion by placing the same in a curing press that deforms the same to toroidal configuration, while simultaneously effectuating the curing of the tire.

While the above description of the invention contemplates the use of layers of film stock which have a uniform thickness, it should be understood that a modified form of stock may be utilized. In this regard and referring to FIGURE 3, it is noted that the modified sheet of film material 30 is formed with a flat side 30a and has a raised portion 30b on the opposed side thereof. Raised portion 30b tapers on both sides to relatively thin ends 30c, 30c adjacent the peripheral edges of the sheet.

It is to be understood that the thickness of the sheet at the apex of the raised portion 30b is the desired thickness of the ply layer. Thus when the beads 14, 14 are set and tapered ends 30c, 30c are turned over the beads, as shown in chain-dotted lines in FIGURE 3, the sheet will be substantially smooth and even except for the presence of the beads, and the sheet will have a substantially uniform thickness throughout.

It will be seen from the foregoing that there has been constructed a tire that envisions the use of tear resistant pliable sheet firm material in lieu of the conventional ply of cord stock so as to result in a tire that has extreme stability while yet being of simplified manufacture. It will further be noted that in the event of puncture or the like, the tire will only be affected in the punctured region rather than being affected throughout the length of the ply cord, as is the case in conventional tire construction.

While a full and complete description of the invention has been set forth in accordance with the dictates of the Patent Statutes, it is to be understood that the invenion is not intended to be limited to the specific embodiment herein shown. Thus, while Orlon, Dacron, rayon and nylon have been described as being suitable sheet stock for use as ply layers in the improved tire of the invention, it is to be understood that other sheet stock, whether plastic or not could be employed, so long as the tear resistance, elasticity, flexibility, and heat resistance qualities thereof approximated or exceeded the appropriate qualities of the sheets that have been described in the preferred form of the invention.

Furher, while the invention has been described as utilizing a bonding agent to restrain transverse shifting of the layers of sheet material relatively of each other, it should be understood that it is similarly possible to provide additional resistance to said shifting by providing interstices on one sheet and appropriate projections on the other sheet so that the same may be received in complemental engagement with each other. In this fashion, the resistance to transverse shifting supplied by the bonding agent is thus complemented.

Accordingly, modifications of the invention may be resorted to without departing from the spirit hereof or the scope of the appended claims.

What is claimed:

1. A pneumatic tire of flat built uncured configuration, comprising;
    (A) a gum liner;
    (B) a first ply including a plurality of sheets of pliable film material and overlying said gum liner;
    (C) a second ply of rubber overlying said first ply;
    (D) a third ply of Fiberglas mesh overlying said second ply;
    (E) axially spaced bead rings;
    (F) said first, second and third plies and said gum liner having the edge portions thereof folded over said bead rings;
    (G) a pair of chafer strips overlying said bead rings and said portion of said plies that are folded over said beads;
    (H) and thread stock superimposed over said folded edges of said third ply;
    (I) said tread and said plies being of generally annular configuration.

2. The tire of claim 1 further characterized by the presence of a bonding substance on said first ply whereby the same is bonded to said gum liner and said second ply.

3. The tire of claim 1 further characterized by the fact that one surface of said sheet has a raised center portion that tapers toward the peripheral edges thereof to form relatively thin edge portions whereby said sheet will possess a substantially uniform cross-sectional thickness upon folding said edge portions of said plies over said bead rings.

4. A pneumatic tire of the character described, comprising;
    (A) a pair of opposed bead rings;
    (B) an inner liner formed to toroidal configuration and having its edges secured with respect to said opposed bead rings of said tire;
    (C) an outer casing member of rubber including thread and sidewall portions whose edges are secured to the opposed beads of said tire;
    (D) a layer of cordless pliable tear resistent material disposed between said inner liner and said outer casing and including
        (1) at least two sheets of said material laminated together with one of said sheets having its greatest tear resistance in a transverse direction while the remaining sheet has its greater tear resistance in a longitudinal direction.

5. A pneumatic tire of the character described, comprising;
    (A) a pair of opposed bead rings;
    (B) an inner liner formed to toroidal configuration and having its edges secured with respect to the opposed beads of said tire;
    (C) an outer casing including tread and sidewall portions whose edges are secured to the opposed beads of said tire;
    (D) at least one layer of cordless pliable tear resistant material laminated between said inner liner and said outer casing and bonded thereto so as to preclude shifting of said inner liner and said outer casing relatively of each other and said layer;
    (E) said layer including
        (1) a first sheet having a series of projections thereon and
        (2) a second sheet having a complemental series of interstices therein
            (a) whereby said projections may be received within said interstices to preclude relative shifting between said sheets.

6. A pneumatic tire of flat built uncured configuration, comprising;
    (A) a gum liner;
    (B) a first ply including at least one sheet of cordless, pliable film material overlying said gum liner;
    (C) a second ply of rubber overlying said first ply;
    (D) a third ply of Fiberglas mesh overlying said second ply;
    (E) axially spaced bead rings;
    (F) said first, second and third plies and said gum liner having the edge portions thereof folded over said bead rings;
    (G) and tread stock superimposed over said folded edges of said third ply.

7. A pneumatic tire of the character described, comprising;
(A) a pair of opposed bead rings;
(B) a tire body including
    (1) an outer ground engaging member,
    (2) an inner liner and
    (3) a layer of cordless pliable tear resistant film material laminated between said ground engaging member and said liner and having resistance to stretching in a plurality of directions
    (4) with said ground engaging member, said liner and said film material having their respective outer edges folded over said bead rings.

References Cited by the Examiner

UNITED STATES PATENTS

| | | | |
|---|---|---|---|
| 1,862,492 | 6/1932 | Mallory | 152—354 |
| 2,757,701 | 8/1956 | Henson | 152—357 |
| 3,062,257 | 11/1962 | Campbell | 152—354 |
| 3,095,027 | 6/1963 | Weber | 152—361 X |

FOREIGN PATENTS 466,004    6/1950    Canada.

ARTHUR L. LA POINT, *Primary Examiner.*

C. W. HAEFELE, *Assistant Examiner.*